March 19, 1963 J. C. SMELTZER ETAL 3,082,332

CAPACITIVE TYPE CIRCULATING REGISTER

Filed Jan. 26, 1961

JACK C. SMELTZER
ELLIOTT E. RECH
INVENTORS
BY John L Jackson
ATTORNEY 3,082,332
CAPACITIVE TYPE CIRCULATING REGISTER Jack C. Smeltzer, Woodland Hills, and Elliott E. Rech, Canoga Park, Calif., assignors to Thompson Ramo Wooldridge Inc., Canoga Park, Calif., a corporation of Ohio Filed Jan. 26, 1961, Ser. No. 85,121
3 Claims. (Cl. 307—88.5)

This invention relates to computer registers in general and more particularly to a circulating register which is capable of parallel output and serial to parallel conversion.

Many types of devices for use as a circulating register have been devised in the past. For instance, registers utilizing a magnetic drum or disc surface to effect a certain delay have been used. Information is written on the magnetic surface of the disc or drum and read therefrom at a predetermined time. Assuming, as is the usual case, that a one bit delay is encountered in the write amplifier and one bit in the read amplifier, all but two bits of the information are stored on the magnetic surface during circulation. It is therefore prohibitively expensive to read from such a register in parallel. Instead, the contents of the register must be serially read from the read amplifier.

In this type of register, it is necessary to use high-gain voltage amplifiers for reading and power amplifiers for writing to compensate for the high attenuation of the stored information which results from the low efficiency of saturation recording and the relatively small signal obtained on reading. Signal-to-noise problems are also acute due to this attenuation of the stored information since in most computers there is a relatively large noise level caused by high current pulses throughout the computer.

Another problem encountered with the use of such a register is that signal information must generally be changed from computer logical levels to that required for the delay device used. Moreover, in the usual instance, a precise physical adjustment of the magnetic heads is required and, therefore, elaborate means must be provided for maintaining physical tolerances during normal temperature and/or humidity variations.

Another register which is presently used is the magnetic core type which employs magnetic cores for information storage. The cores are driven to saturation in one direction or the other in accordance with whether a One or a Zero is held. When a core is to be interrogated, a pulse is applied in a direction such as to drive it to a certain state of saturation. During the time that the interrogation pulse is being applied, a sensing is made of the core to determine whether or not it changes from one state of saturation to the other. The previous state of the core is thus determined. Special power amplifiers are necessary to drive the cores and special voltage and power amplifiers are required to read from them. As is obvious, while such a register is capable of parallel output, it is, like the register using a magnetic medium for delay, not capable of circulation without amplification. Again, in this type of register signal attenuation and signal-to-noise problems are attendant, due to the relatively low signal generally obtained from the sense windings of the cores, and the relatively high noise level in most digital computers.

The flip-flop register, another register which is widely used at present, utilizes a series of flip-flops to store and shift or circulate information. A number of flip-flops, which may be of the Eccles-Jordan type, are serially connected with the output of one being fed to the input of the next. The advantages of flip-flop registers over those registers employing a magnetic medium to effect a delay are numerous. Included advantages are the ability to parallel output, low signal attentuation, good fidelity, operation at the logical levels of the computer, good signal-to-noise ratios, circulation without amplification, and relative stability over normal temperature and humidity fluctuations. With the exception of parallel outputting and relative stability during normal temperature variations, these advantages are equally applicable to magnetic core type registers.

Flip-flop registers do, however, have several short-comings such as a susceptibility to both noise on the input lines as well as spiked noise on the supply lines. To make reasonably certain that the flip-flops are switched only by intended inputs, certain modifications are usually made to the standard two transistor Eccles-Jordan flip-flop. Among these changes is the addition of two transistors and associated circuitry to provide a clocked input. The transistors act as a gate and allow an input to the register only during the clock period. Addition of two transistors and associated components, of course, results in higher costs. Another shortcoming of flip-flop shift registers is that the alpha-cutoff and switching time requirements of the transistors used are relatively severe which necessitates the use of higher cost transistors which in turn result in higher per bit costs. In addition, the matching of components in flip-flop shift registers is quite important since component mismatch inherently results in deterioration of performance due to the inherent symmetrical characteristics of a flip-flop.

Ideally then a circulating register should have all of the attributes of a flip-flop shift register, i.e., parallel output ability, low signal attenuation, good fidelity, operation at the logical levels of the computer, good signal-to-noise characteristics, circulation without amplification and relative stability over normal temperature and/or humidity variations. In addition, over and above flip-flop shift registers, it should be relatively immune from noise on the input lines, be relatively immune from spiked noise on the supply lines, use inexpensive transistors in which the alpha-cutoff and switching time requirements are relatively unsevere, use low cost diodes in which the back resistance and recovery time requirements are relatively unsevere, operate satisfactorily despite relatively large clock width and supply voltage variations, and use other low tolerance components with little or no resultant deterioration in performance.

It is, therefore, an object of the present invention to provide a circulating register for use in a digital computer, the output of which may be taken serially or in parallel.

It is another object of the present invention to provide a circulating register which is capable of operation at the logical levels of the machine in which it is used.

It is another object of the present invention to provide a circulating register in which the signal information is circulated with very little resultant attenuation and loss in fidelity.

It is another object of the present invention to provide a circulating register having extremely good signal-to-noise characteristics.

It is another object of the present invention to provide a circulating register which is relatively stable over normal temperature and/or humidity variations.

It is another object of the present invention to provide a device which is relatively inexpensive in that relatively few components are required.

It is another object of the present invention to provide a circulating register which has good noise immunity properties and which is not sensitive to spiked noise on supply lines.

It is another object of the present invention to provide a circulating register wherein no amplification is required to maintain information circulation.

It is another object of the present invention to provide a circulating register which is capable of operating satisfactorily despite relatively large clock width and supply voltage variations.

Other and further objects and advantages of the herein-described invention will become apparent to those skilled in the art, when considered in light of the accompanying drawings in which.

Briefly, the present invention is a circulating register which is made up of a plurality of stages which utilize capacitors for information storage and circulation. Each capacitor is charged by a clock means in accordance with the input to the particular stage involved, the charge across the capacitor being indicative of the information content of the stage.

While the register in the present device is described as a circulating register, it should be understood that the device is equally useful as a shift type register wherein information is entered into and shifted out of the register without circulation as in a flip-flop circulating register.

Figure 1:
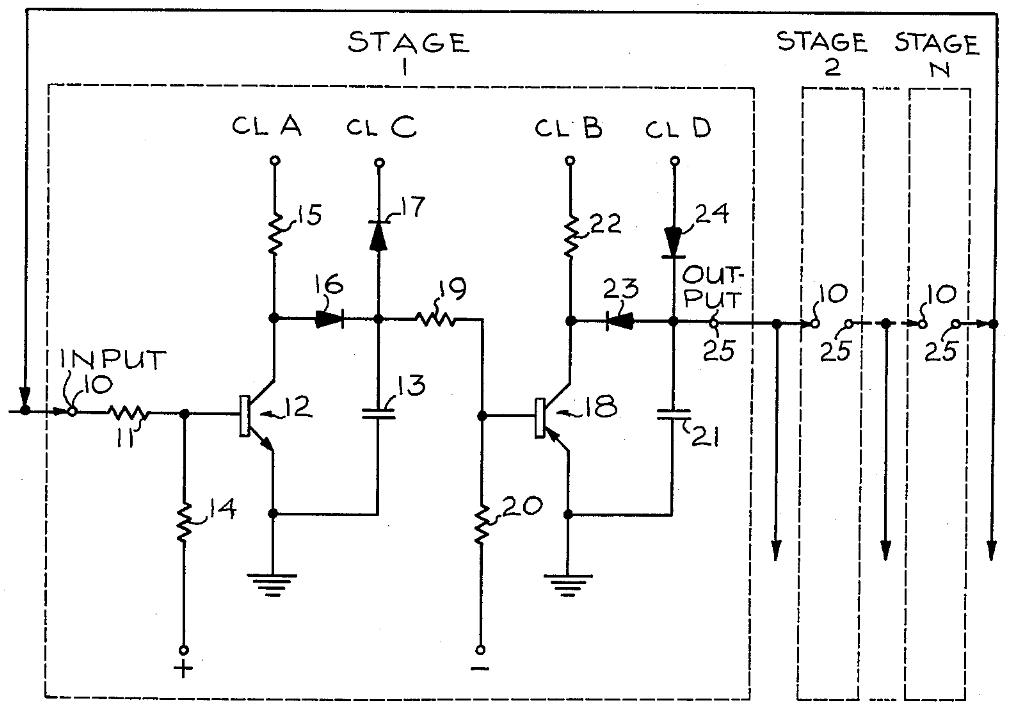
FIG. 1 is a schematic of the circulating register of the present invention.

For a detailed description, refer next to FIG. 1 wherein is shown a schematic diagram of the present invention. While a circuit description of only one stage will be given, as is apparent from a consideration of FIG. 1, a register of any desired length can be made simply by serially adding additional stages of the type herein described. As is further obvious from a consideration of FIG. 1, the contents of the register may be taken in parallel from each stage 1, 2 . . . N or may be taken serially from any stage or bit position to accomplish a shift. Each stage of the present invention is identical. The input to the register as shown in FIG. 1 is along line 10 into stage 1 and may be from an external source or from another stage of the register itself. Techniques of shifting will not herein be discussed and for the purposes of brevity it will be assumed that the input to the register is along line 10 to stage 1 while the output for circulation will be from the Nth stage into stage 1. As previously stated, the output of the register can be serial from any stage or may be in parallel from all stages 1 through N simultaneously.

As illustrated in FIG. 1, the input to the circuit is along line 10 through resistor 11 to the base of transistor 12 which is of the NPN type. In the absence of an input, the base of transistor 12 is held positive by the positive potential applied through bias resistor 14. The emitter of transistor 12 and one side of capacitor 13 are grounded. The collector of transistor 12 is connected through resistor 15 to clock A. Clock A is also connected through diode 16 to the non-grounded side of capacitor 13. The non-grounded side of capacitor 13 is also connected both to clock C through diode 17 and the base of transistor 18, which is of the PNP type, through resistor 19.

The base of transistor 18 is held negative in the absence of a positive charge on capacitor 13 by the application of a negative potential through resistor 20. The emitter of transistor 18 and one side of capacitor 21 are grounded while the collector of transistor 18 is connected through resistor 22 to clock B. Clock B is also connected through resistor 22 and diode 23 to the non-grounded side of capacitor 21. The non-grounded side of capacitor 21 is also connected to both clock D through diode 24 and the output terminal 25.

Figure 2:
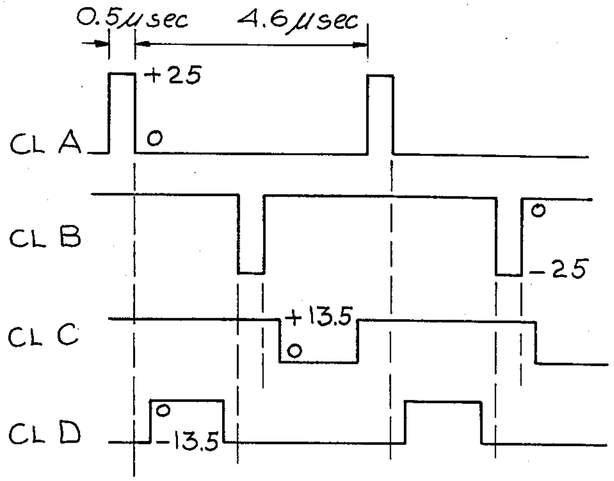
FIG. 2 is a chart showing the particular timing utilized in operation of the register of FIG. 1.

Refer next to FIG. 2 which is a timing chart illustrating four clocks which may be used with the subject device. Clock A may for instance be a +25 v. pulse, 0.5 μsec. in width and 4.6 μsec. in separation. Clock B is equal to clock A in period, but it is negative and occurs midway between clock A pulses. Clock C may be +13.5 v. falling to 0 v. after clock B and rising to +13.5 v. prior to the beginning of the next clock A. Clock D may be −13.5 v. rising to 0 after clock A and falling to −13.5 v. prior to clock B.

For the purposes of explanation, assume that two logical levels as follows are used in the computer wherein the subject register is employed: 0 volts for false; −10 volts for true. While operation in a computer employing negative logical levels will be described, it should be apparent to those skilled in the art that the device is equally suited for operation in computers employing positive logical levels.

In operation, the input, which may be either from the output of the last stage of the circulating register or may be from some other point in the computer or peripheral equipment is applied to the base of transistor 12 through resistor 11. In accordance with the assumed logical levels, the transistor 12 can be turned On if the input is false but cannot be turned On if the input is true. Assume again, for purposes of explanation, that the input to the register is true. In this event, as previously stated, transistor 12 cannot be turned On. Thus, when clock A (+25 v.) comes along, it will charge capacitor 13 positively through resistor 15 and diode 16 which is forward biased during clock A. A positive potential will thus be on the base of transistor 18 when clock B (−25 v.) comes along. This positive potential on the base of transistor 18 will prevent it from being turned On. Thus, clock B (−25 v.) will charge capacitor 21 negatively through resistor 22 and forward biased diode 23. The output terminal 25, by virtue of the negative charge on capacitor 21, is at a negative potential which is indicative of the "true" input to the register stage.

Assume next, for purposes of illustration, that a false input is received. In this event, the base of transistor 12 is at approximately ground potential, which allows the transistor 12 to be turned On. When clock A (+25 v.) comes along, the transistor is turned On and collector current flows through resistor 15 to ground. The resultant voltage drop across resistor 15 prevents capacitor 13 from being charged positively by clock A. In this manner, the collector of transistor 12 is clamped to substantially ground potential. Since capacitor 13 has substantially a zero charge on it, the action of the negative source through resistor 20 will cause the base of transistor 18 to be held negative. The transistor will therefore conduct when clock B (−25 v.) occurs. When clock B (−25 v.) occurs, collector current flows through resistor 22 to ground. Thus, clock B (−25 v.) is inhibited from charging capacitor 21 due to the clamping action of transistor 18. Capacitor 21 and the output terminal 25 thus remain at substantially ground potential, which is indicative of the false input received.

Clock C and clock D are used merely to discharge the capacitors 13 and 21 respectively so that each bit is isolated from the preceding bit. Clock C (0 v.) is applied to the cathode of diode 17 which is forward biased during clock C to discharge capacitor 13 prior to the next clock A. Clock D (0 v.) is applied to the anode of diode 24 which is forward biased during clock D to discharge capacitor 21 prior to the next clock B. As is apparent, clocks C and D need not necessarily be timed as described in the present illustration since their only function is to discharge capacitors 13 and 21 respectively.

From a consideration of the above description, it can be seen that the alpha-cutoff and switching time requirements of transistors 12 and 18 are quite unsevere since the transistors are not switched into and out of saturation or back and forth without entering saturation, as is the case in flip-flop circuits. Instead, the transistors are used as clamps in an inhibiting function and thus the allowable alpha-cutoff and switching margins are quite large.

Another advantage of the subject capacitive type circulating register over flip-flop registers is its high degree of immunity from spiked noise on supply lines which results from the storage of information on capacitors 13 and 21 with their inherent smoothing properties. Additionally, the present invention is relatively immune from noise on its input lines since it has in effect a clocked input due to the fact that no change in the state of transistor 12 will result from signal variations on its base in the absence of clock A.

In the above-described manner, I have provided a device which is capable of parallel output and which is capable of information circulation without amplification. No substantial attenuation in the delaying process is encountered in the use of the present device and no problems of voltage and power amplification are encountered. The device is further capable of operating at the logical levels of most computers and is particularly immune from both spiked noise on supply lines as well as random noise within the machine itself. The device uses relatively few components per bit of storage. The transistors used need not be expensive in that the alpha-cutoff and switching time requirements are not severe. Likewise, inexpensive diodes may be used since the back resistance and recovery times are not critical. The other components in the register may likewise be inexpensive since no symmetrical flip-flop arrangement is used and therefore component mismatch will not result in deterioration in performance. Moreover, the margins of clock width, height and of supply voltage amplitude are greater for the present invention that for switching-type flip-flops.

While there has been described what is at persent considered to be a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A circulating register including a plurality of stages comprising in each of said stages first and second capacitors, a first clock means and a first transistor inhibiting means responsive to an input signal electrically connected to said first capacitor whereby said first clock means is allowed to charge said first capacitor in accordance with said input signal, a second transistor inhibiting means electrically connected between said first capacitor and said second capacitor and responsive to the said charge on said first capacitor, second clock means electrically connected to both said second transistor inhibiting means and said second capacitor whereby said second capacitor is charged by said second clock means in accordance with the said charge on said first capacitor, third clock means electrically connected to said first capacitor, and fourth clock means electrically connected to said second capacitor.

2. A circulating register including a plurality of stages comprising in each of said stages a first transistor having a base, emitter and collector, the collector of said first transistor being electrically connected to both a first clock source and to a first side of a first capacitor, the second side of said first capacitor and the emitter of said first transistor being electrically connected to ground, a second transistor having an emitter, base and collector, the base of said second transistor being electrically connected to the first side of said first capacitor, means for biasing said first and second transistors to conduction in the absence of an input signal to said stage, a second capacitor having first and second sides, the second side of said second capacitor and emitter of said second transistor being both electrically connected to ground, the collector of said second transistor being connected to a second clock means, the collector of said second transistor being also connected to said first side of said second capacitor, third clock means electrically connected to said first side of said first capacitor, and fourth clock means electrically connected to said first side of said second capacitor.

3. A circulating register including a plurality of stages comprising in each of said stages a NPN transistor having an emitter, base and collector, a first capacitor having first and second sides, first positive clock means connected to the collector of said NPN transistor, the emitter of said NPN transistor and said second side of said first capacitor being connected to ground, said collector of said NPN transistor being also connected to said first side of said first capacitor, a first negative clock means connected to said first side of said first capacitor, a PNP transistor having an emitter, base and collector, means for biasing said NPN and said PNP transistors to conduction in the absence of an input signal to the base of said NPN transistor, the base of said PNP transistor being connected to said first side of said first capacitor, a second capacitor having first and second sides, the emitter of said PNP transistor and said second side of said second capacitor being connected to ground, second negative clock means connected to said collector of said PNP transistor, said first side of said second capacitor also being connected to said collector of said PNP transistor, and second positive clock means connected to said first side of said second capacitor.

References Cited in the file of this patent

IBM Technical Disclosure Bulletin, vol. 2, No. 6, April 1960, page 102, "RC Coupled Tunnel Diode Shift Register," by A. J. Gruodis.